(12) United States Patent
Rawlins et al.

(10) Patent No.: US 8,321,408 B1
(45) Date of Patent: Nov. 27, 2012

(54) QUICK ACCESS TO HIERARCHICAL DATA VIA AN ORDERED FLAT FILE

(75) Inventors: Mark L. Rawlins, Orem, UT (US); Larry B. Nash, Provo, UT (US); Joel J. Wilson, Spanish Fork, UT (US); Alan D. Reed, Auburn, AL (US); Devry M. Anderson, Pleasant Grove, UT (US); Daniel M. Floyd, West Jordon, UT (US)

(73) Assignee: Infotrax Systems, Orem, UT (US)

( * ) Notice: Subject to any disclaimer, the term of this patent is extended or adjusted under 35 U.S.C. 154(b) by 72 days.

(21) Appl. No.: 13/151,019

(22) Filed: Jun. 1, 2011

(51) Int. Cl.
*G06F 17/30* (2006.01)
(52) U.S. Cl. ........................................................ 707/718
(58) Field of Classification Search .......... 707/709–720, 707/748–754, 802–804; 726/26
See application file for complete search history.

(56) References Cited

U.S. PATENT DOCUMENTS

| | | | |
|---|---|---|---|
| 2003/0074352 A1* | 4/2003 | Raboczi et al. | 707/4 |
| 2004/0044727 A1* | 3/2004 | Abdelaziz et al. | 709/203 |
| 2006/0089946 A1* | 4/2006 | Schumacher | 707/102 |
| 2008/0027788 A1* | 1/2008 | Lawrence et al. | 705/10 |
| 2009/0083400 A1* | 3/2009 | Draca et al. | 709/220 |
| 2011/0264781 A1* | 10/2011 | Moser et al. | 709/223 |
| 2011/0314002 A1* | 12/2011 | Oliver et al. | 707/722 |

* cited by examiner

*Primary Examiner* — Wilson Lee
(74) *Attorney, Agent, or Firm* — Workman Nydegger

(57) ABSTRACT

Access to hierarchical data stored in a database is facilitated by using an ordered flat file that maintains the hierarchical organization of the data. Queries against the hierarchical data are processed by accessing the ordered flat file rather than the underlying database. The speed of accessing the ordered flat file is increased by using memory mapping the ordered flat file. Changes to the data in the underlying database are reflected in real-time without regenerating the ordered flat file by employing an overflow area for storing changes to elements that cannot be made within the ordered flat file.

20 Claims, 5 Drawing Sheets

QUICK ACCESS TO HIERARCHICAL DATA VIA AN ORDERED FLAT FILE

CROSS-REFERENCE TO RELATED APPLICATIONS

Not Applicable.

BACKGROUND

Background and Relevant Art

Many businesses store hierarchically organized data in databases where any entry (or row) may be the parent of one or more child entries (or rows) within the database. A typical hierarchically organized database stores data in a relational database table. Although standard relational database access techniques can be used to access and process hierachical data stored in this manner, these techniques can be slow especially when the hierarchical structure is large.

These slower techniques that have been used for accessing and processing hierarchical data have limited the number and type of real-time applications which consume the hierarchical data. In one example, multi-level marketing companies maintain hierarchical data structures representing the hierarchy of individuals participating in the multi-level marketing scheme.

A typical hierarchical database will store many different pieces of data for each individual such as the total amount of sales for the individual in a specified period, a number of new customers obtained in a specified period, etc. One common computation performed on the hierarchical data is the calculation of commissions based on the total amount of sales for each individual. One individual's commission is generally based not only on the individual's sales, but the sales of other individuals under the individual in the hierarchy. In a large hierarchy, it may take a relatively long time to calculate the commission, or to calculate another figure that is dependent on the hierarchical relationships, for an individual.

For at least these and other reasons, many functions cannot be provided in real-time. Specifically, conventional databases make it difficult or impossible to provide or display certain real-time information such as commissions for individuals in a multi-level marketing organization. Accordingly, there are a number of disadvantages with organizational databases that can be addressed.

BRIEF SUMMARY

The present invention extends to methods, systems, and computer program products for creating and accessing hierarchical data in an expedited way. In particular, implementations of the present invention involve the use of one or more flat files to expedite the processing of queries against the data of an underlying hierarchically organized database.

In one embodiment, an ordered flat file can be created from a database of hierarchically organized elements. The ordered flat file maintains the hierarchical organization of the elements. A query is received that includes filtering conditions to apply to a hierarchical sub-portion of the hierarchically organized elements to generate a result set. The ordered flat file is accessed to identify a parent element of the hierarchical sub-portion. Further, each subsequent element is sequentially accessed until an element is accessed that is at the same or higher level in the hierarchy as the parent element. Finally, while accessing the hierarchical sub-portion, the filtering conditions are applied to each element in the sub-portion to generate the result set.

In another embodiment, an ordered flat file is created from a database of hierarchically organized elements. The ordered flat file maintains the hierarchical organization of the elements. When an update is received to one or more of the hierarchically organized elements in the database, a determination is made as to whether the update can be reflected in the ordered flat file. If the update can be reflected in the ordered flat file, the ordered flat file is updated; otherwise, if the update cannot be reflected in the ordered flat file, an entry is added to an overflow area that represents the update. When a query is received for a sub-portion of the hierarchically organized elements that includes at least one of the one or more updated elements, it can be resolved by accessing the ordered flat file and the overflow area to generate a hierarchically ordered result set that is accurate in real-time.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for creating and accessing hierarchical data in an expedited way. In particular, implementations of the present invention involve the use of one or more flat files to expedite the processing of queries against the data of an underlying hierarchically organized database.

In one embodiment, an ordered flat file can be created from a database of hierarchically organized elements. The ordered flat file maintains the hierarchical organization of the elements. A query is received that includes filtering conditions to apply to a hierarchical sub-portion of the hierarchically organized elements to generate a result set. The ordered flat file is accessed to identify a parent element of the hierarchical sub-portion. Further, each subsequent element is sequentially accessed until an element is accessed that is at the same or higher level in the hierarchy as the parent element. Finally, while accessing the hierarchical sub-portion, the filtering conditions are applied to each element in the sub-portion to generate the result set.

In another embodiment, an ordered flat file is created from a database of hierarchically organized elements. The ordered flat file maintains the hierarchical organization of the elements. When an update is received to one or more of the hierarchically organized elements in the database, a determination is made as to whether the update can be reflected in the ordered flat file. If the update can be reflected in the ordered flat file, the ordered flat file is updated; otherwise, if the update cannot be reflected in the ordered flat file, an entry is added to an overflow area that represents the update. When a query is received for a sub-portion of the hierarchically organized elements that includes at least one of the one or more updated elements, it can be resolved by accessing the ordered flat file and the overflow area to generate a hierarchically ordered result set that is accurate in real-time.

Figure 1:
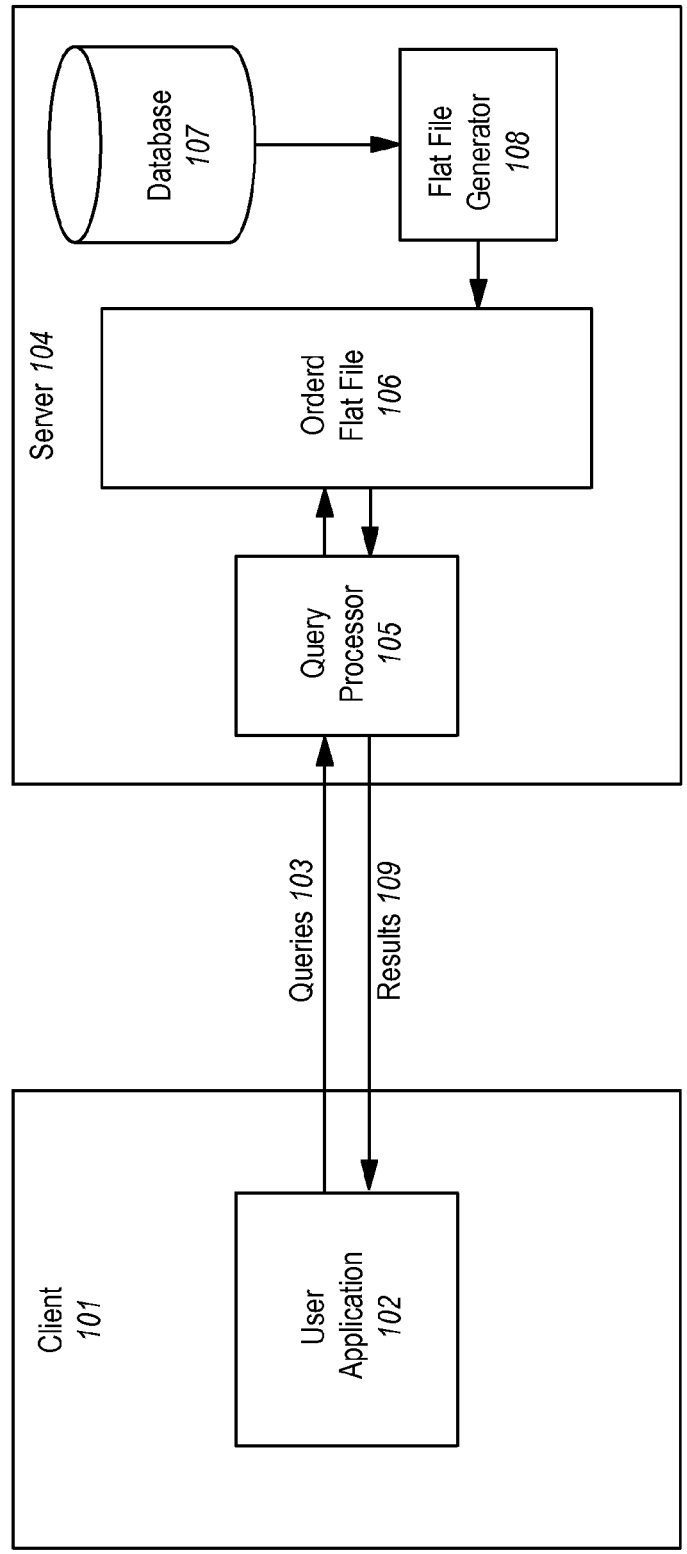
FIG. 1 illustrates an exemplary computer environment in which the present invention may be implemented.

FIG. 1 illustrates a generalized computer environment including a client 101 and a server 104 according to embodiments of the present invention. Client 101 may be any computer including a desktop, laptop, smart phone, etc. User application 102 on client 101 is an application that sends queries to server 104 for viewing hierarchical data stored in database 107. For example, user application 102 may be a general purpose web browser, or may be a dedicated local or web-based application.

To expedite the processing of such queries, at least one implementation of the present invention involves use of a flat file generator 108 on server 104 to create and maintain an ordered flat file 106. The ordered flat file 106 stores at least some of the hierarchical data of the database 107 as a flat file that maintains the hierarchical organization of the data as will be further described below with reference to FIG. 2. When a query is received from user application 102, the query processor 105 on server 104 accesses the ordered flat file 106 to resolve the query rather than accessing the underlying data in database 107.

Figure 2:
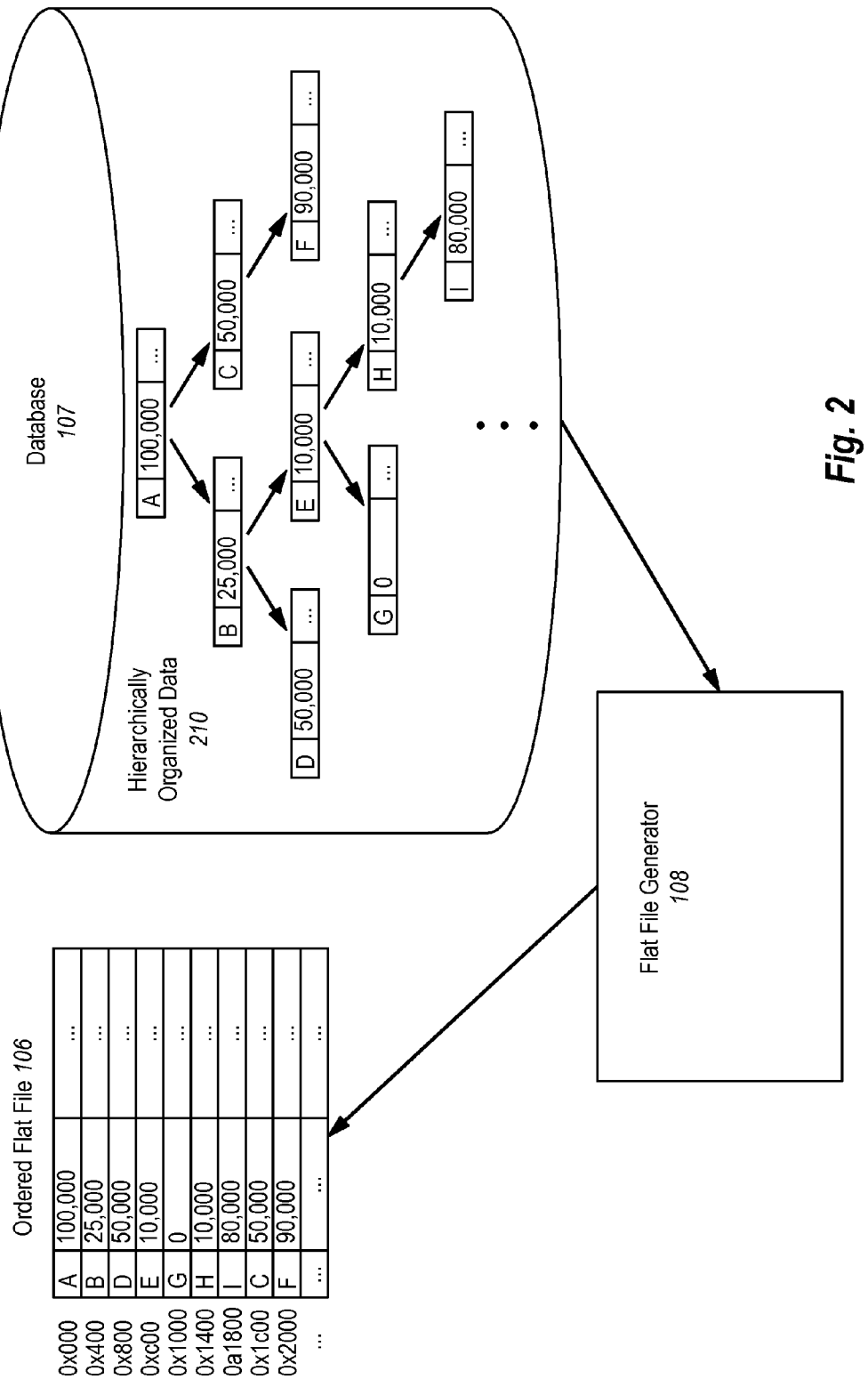
FIG. 2 illustrates exemplary hierarchically organized data and an exemplary ordered flat file derived from the data.

FIG. 2 depicts a database 107 which stores exemplary hierarchically organized data 210. The hierarchically organized data comprises a plurality of elements that each has at least one parent child relationship with another element. FIG. 2 also illustrates an exemplary ordered flat file 106 created from the hierarchically organized data 210 by flat file generator 108. Hierarchically organized data 210 is shown as a tree structure for ease of illustration; however, an ordered flat file can be created from an underlying database of any type or format (e.g., relational, flat file, etc.). The ordered flat file 106 is structured such that all direct descendants of an element are listed directly below the element within the flat file. For example, because element A is the base node and all other elements are descendants of element A, it is listed first in the ordered flat file.

Next, element B is listed with all its direct descendants listed directly below it and prior to any other element that is at the same level or a higher level in the hierarchy than element B. For example, element C (which is at the same level as element B (i.e., a brother of element B)) is listed after all of element B's direct descendants (elements D, E, G, H, and I).

In this way, any element's descendants can be quickly determined by reading the ordered flat file 106 until an element with the same or higher level in the hierarchy is reached. For example, it can quickly be determined that element I does not have any descendants because the next element below element I in the ordered flat file 106 is element C, which is a brother to element B, and is three levels higher than element I in the hierarchy.

The listed fields in the ordered flat file 106 of FIG. 2 represent the element's name (or identifier) and a total sales amount for the person represented by the element. However, an ordered flat file can include any number of fields storing any type of data as indicated by the ellipses. For example, each element in the ordered flat file 106 may include a field which defines the element's level in the hierarchy, as well as other fields containing data that may be used to calculate reports. The ordered flat file 106 of FIG. 2 depicts elements that are 1 KB in size as represented by the hexadecimal addresses to the left of each element. However, any size may be allocated to elements in the hierarchy. In a preferred embodiment, each element is the same size.

An ordered flat file can be particularly beneficial in representing a "downline" of an individual in a hierarchical organization, such as a multi-level marketing business structure. An individual's downline in a multi-level marketing hierarchy refers to the individual and all other individuals that fall below the individual in the hierarchy. Using the example of FIG. 1, element B's downline would include elements B, D, E, G, H, and I (but not C, F). As can be seen, this downline can quickly be determined by sequentially reading the ordered flat file from element B to element I (excluding C, F).

Generally, it is quicker to access hierarchical data stored in an ordered flat file than it is to access the same data stored in an underlying database. Therefore, calculations based on hierarchical data, such as commissions as previously described, can be performed more quickly by creating an ordered flat file of the hierarchical data, and accessing the hierarchical data within the ordered flat file to generate the required result set.

An ordered flat file may be created from a hierarchical dataset stored in an underlying database at various times. For example, a multi-level marketing business may update its database with sales figures at the end of each business day. After the updates are entered each day, an ordered flat file may be generated to represent the state of the hierarchical data after the updates for that day are entered. Of course, an ordered flat file may be created at any interval.

Some hierarchical datasets, even when structured as an ordered flat file, may still be too slow to access for some real-time operations, particularly where important updates happen frequently throughout a desired time interval. For example, a web interface for viewing calculations on a client's downline may be unsatisfactory if each calculation requires 10-15 seconds at best to process. Accordingly, in some embodiments, the present invention provides further optimizations to hierarchical data processing to enable very quick access to and calculations on hierarchical data.

One optimization provided in at least one implementation of the present invention is the use of memory mapping to access the ordered flat file. In general, the ordered flat file is stored on disk, although other storage devices could also be used. Memory mapping can significantly reduce the access time required to read from the ordered flat file. For example, in traditional hard disk access, multiple steps are taken (e.g., system calls) to read a block of data from the hard disk. By using memory mapping, however, implementations of the present invention reduce access time by bypassing many of the steps required in traditional disk access.

Specifically, memory mapping maps the ordered flat file into the application's memory, thus allowing the application to treat the ordered flat file as if it were stored in memory (even though the file remains on disk). More specifically, memory mapping provides a range of memory representing the ordered flat file's location on disk. To read the ordered flat file, the application reads from the range of memory, which is generally substantially quicker than performing standard I/O to read the ordered flat file on disk.

One specific function provided by POSIX-compliant systems for performing memory mapping is the mmap( ) function. Other functions that perform memory mapping could also be used to implement the present invention. By using memory mapping in conjunction with an ordered flat file, implementations of the present invention greatly increase the speed at which result sets can be generated from hierarchical datasets.

Generally, a query for data of a hierarchical dataset requests a sub-portion of the hierarchical dataset. One example includes a query for an individual's downline. As described above, the sub-portion of hierarchical data can be obtained by reading a sequential portion of the ordered flat file which may be quickly performed using memory mapping. To locate the beginning of the sequential portion to be read, a starting element must be identified. For example, to locate the beginning of element B's downline, element B must be identified in the ordered flat file.

Two approaches can be taken to locate the beginning of the sequential portion: sequential and random access. Sequential access refers to reading from the beginning of the ordered flat file (e.g., reading at the memory address returned by the mmap( ) function) and continuing to read the elements in the ordered flat file until the first element of the sequential portion is identified. Once the first element is identified, any filtering conditions in the query can be applied to the elements in the portion as the elements are read.

Random access, on the other hand, refers to reading an element of the ordered flat file without first reading the preceding elements in the ordered flat file. Random access can be accomplished by maintaining an index of offsets for each element in the ordered flat file. An element's location in the ordered flat file can be determined by reading the element's offset within the index, and accessing the ordered flat file at the address represented by the offset.

In either sequential or random access, once the first element of the sequential portion is identified, the remaining elements of the sequential portion can quickly be retrieved by sequentially reading the ordered flat file until an element that is at the same or higher level in the hierarchy is identified at which point no further reads need to be performed. As each element in the sequential portion is read, the filtering criteria can be applied to generate one or more result sets. In other words, only a single pass of the ordered flat file is required to identify the relevant portion and to apply the filtering criteria to the portion to generate one or more result sets.

Although both sequential and random access are feasible, it has been found that even with very large hierarchical datasets, by using memory mapping in conjunction with an ordered flat file, sequential access, on average, locates the beginning of a desired sequential portion quicker than random access.

Another optimization provided by at least one implementation of the present invention is the generation of multiple result sets during a single pass of the ordered flat file. For example, if a client requests that multiple different filter criteria be performed on his downline, each filter can be performed during a single access of the downline.

In conventional approaches, generating multiple result sets during a single pass of the dataset has been impossible or impractical. With implementations of the present invention, however, by using memory mapping to access an ordered flat file, many different calculations can be performed in a single pass with no apparent effect on the speed of processing the request.

When a downline is traversed a technique can be employed to derive additional data or information about any parent node in the downline. This technique stores one or more temporary values (e.g. in one or more temporary fields in a memory stack) for the parent node as the parent node's downline (which is a subset of the overall downline being traversed) is traversed. Once the entire downline of any parent node is completely traversed and the temporary values updated accordingly, the temporary values can be added to the output for the parent node, or used in the filtering conditions of the parent node to determine if the parent node should be output as meeting the filtering conditions.

For example, a query that requests all parent nodes (e.g. a node representing an individual who has other individuals below him in the hierarchy) in a downline that have a certain number of individuals below them whose aggregate sales exceed a specified amount can be determined using temporary fields as the downline is traversed. As the downline is traversed, one or more temporary values for each parent node can be updated to aggregate the sales of the individuals below each parent node in the downline. After a certain parent node's downline (which is a subset of the overall downline) is fully traversed, the temporary values stored for the parent node may be evaluated to determine whether the parent node should be output. Of course, this evaluation could be performed after the overall downline is fully traversed (i.e. the temporary values of each parent node could be evaluated after the overall downline is fully traversed rather than evaluating the temporary values of a particular parent node after the particular parent node's downline within the overall downline has been traversed).

For example, referring to FIG. 2, if the query is for all individuals in A's downline who have sponsored individuals whose aggregate sales exceed $300,000, a temporary value can be created for each individual in the downline. As the downline is traversed, the sales of each individual can be added to the appropriate temporary values (i.e. to the temporary value of each individual that is above the individual in the hierarchy). Then, upon the complete traversal of the downline, each individual having a temporary value that exceeds $300,000 can be returned to satisfy the query. In this example, and based on FIG. 2, only element A would meet the criteria of this query.

In order to use memory mapping efficiently, the size of the ordered flat file should not change. However the contents of an individual record (or row) can be updated if the length of the row (and therefore, the size of the file) is not changed. In contrast, if an entry were added to the ordered flat file thus increasing the size of the ordered flat file, a new memory mapping would be required. Therefore, in embodiments of the invention, a memory mapping is performed only when a new ordered flat file is generated from the underlying hierarchical data in the database (e.g., every night after all sales data from the day is entered into the hierarchical dataset in the underlying database).

However, if the ordered flat file is not updated as changes are made to the underlying database, a client will not have real-time access to his data (i.e. the client will not see changes made to the data in the underlying database until a new ordered flat file is generated). To provide real-time access to the current data in the underlying database without regenerating the ordered flat file and remapping to it each time a piece of data changes in the underlying database, implementations of the present invention can employ an overflow area which temporarily stores data updates which do not otherwise fit in the ordered flat file. For example, if a data value in the underlying database changes for which an entry in the ordered flat file already exists, the changed value can generally be written over the original data value in the ordered flat file. In such scenarios, it may not be necessary to write the changed value to the overflow area.

In contrast, if a new data element is added in the underlying database (e.g. by adding a new client to the hierarchical structure), the existing ordered flat file will not contain the new data element. Accordingly, an entry for the new element is then added to the overflow area. The overflow area may be stored in any accessible area including in memory or on disk.

To ensure that queries to the ordered flat file account for the new data element, the new data element is added to the overflow area, and an indication is inserted in the ordered flat file at an appropriate location to identify the existence of the new data element. For example, each entry in the ordered flat file may include one or more bits that when set indicate that an entry exists in the overflow area that belongs before or after the entry. Referring to FIG. 2, if an element J were added to the hierarchically organized data 210 as a child of element D, the ordered flat file 106 could be modified by adding one or more bits to the entry for element D (or element E), indicating that element J belongs after element D in the ordered flat file.

The one or more bits added to the entry may comprise a flag that indicates that the overflow area should be searched for the next element. In such embodiments, the elements in the overflow area would include information that identifies their respective locations within the ordered flat file. In other embodiments, the one or more bits may constitute a pointer that points to the location within the overflow area where the next element of the hierarchy is stored.

For example, element D may contain a pointer field that can be written to indicate that the next element in the ordered flat file is in the overflow area at the address in the pointer field rather than the next sequential element in the ordered flat file. In such embodiments, the elements in the overflow area may also contain a pointer field with an address that points back to the next element in the ordered flat file. For example, element J may contain a pointer back to the address of element E within the ordered flat file. Various other techniques for indicating the existence of an additional element in the overflow area may be used in embodiments of the invention.

In some embodiments, a similar approach can be taken to indicate that an element of a hierarchical dataset has been deleted. For example, if element I were deleted from the hierarchical dataset, an indication can be added to the ordered flat file (e.g., to element H) indicating that the next element is no longer part of the hierarchical dataset. In other embodiments, an indication could be added directly to element I to indicate that it is no longer part of the hierarchical dataset.

Figure 3:
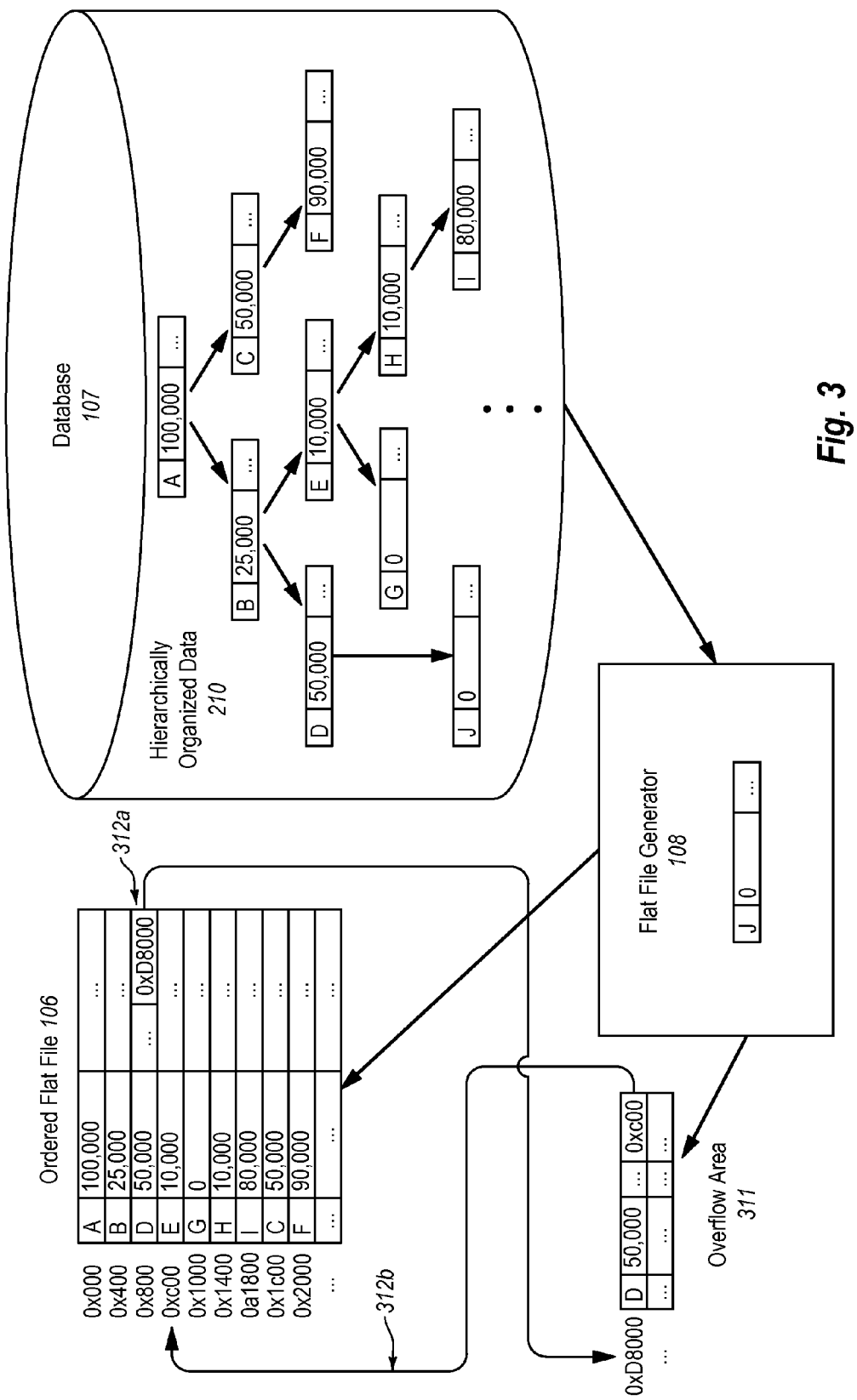
FIG. 3 illustrates how an ordered flat file can be updated according to one or more embodiments of the invention.

FIG. 3 illustrates how changes to the data 210 in the underlying database 107 can be reflected in real-time without regenerating the ordered flat file 106. Although the underlying database is represented as a tree structure having a node for each element and its associated data similar to that shown in FIG. 1, any structure for the underlying database could be used (e.g., relational tables). As shown, element A includes a change to its total sales field from $100,000 to $125,000. The corresponding field in the ordered flat file which, before the change, includes $100,000 can be directly updated to include $125,000 because the value fits in the size allocated for the field. In this way, the ordered flat file 106 is updated to provide the most up-to-date figures for element A.

FIG. 3 also shows that a new element, element J, is added as a child of element D. Because element J and its associated data are new, an entry must be added to the overflow area 311. The format of the entry for element J in the overflow area may be identical to the format of any other element in the ordered flat file as shown in FIG. 3, although a different format for elements in the overflow area could be used.

As described above, the ordered flat file 106 is updated to indicate the existence of the entry for element J in the overflow area. FIG. 3 shows the embodiment where a pointer 312a is added to the preceding element in the hierarchy (element D) to point to the address where the entry for element J is stored in the overflow area 311. Element J also includes a pointer 312b pointing back to element E.

When a query is received that requests the downline of element D, the ordered flat file 106 will be accessed to locate element D. Upon reading element D, it will be determined that the overflow area 311 is to be accessed to read the next element in the hierarchy (such as by following a pointer, or detecting a flag, etc.). In the example of FIG. 3, when element J is read in the overflow area, it will be determined that element J is at a lower level of the hierarchy than element D and will thus be included in D's downline. The information in the entry for element J will direct access back to element E in the ordered flat file 106. Because element E is at the same level in the hierarchy as element D, it will be determined that the end of D's downline has been reached, and therefore no further access to the ordered flat file is required.

When a new ordered flat file is created, the existing ordered flat file and its associated overflow area may be deleted. The new ordered flat file may be created directly from the hierarchical dataset in the database which reflects the most current state of the data. In other words, the ordered flat file and the overflow table function to provide real-time access to the underlying data, while the underlying database remains the actual source of the hierarchical data. One will appreciate, however, that the invention also extends to embodiments where no underlying database is used. In such embodiments, the ordered flat file and overflow area serve as the source of the hierarchical data, thus requiring new ordered flat files to be generated from a previous ordered flat file and its associated overflow area.

Another feature provided by implementations of the invention is the ability to compare two or more ordered flat files. For example, different ordered flat files may be maintained for different periods of time such as to represent sales made during each period of time. The invention allows different ordered flat files to be compared even when the ordered flat files contain different fields, rows, or columns. For example, if an MLM business began tracking a new data figure one month in its database, the ordered flat file—which includes the new data figure for each element in the hierarchy—may still be compared to an ordered flat file for a previous month that does not contain the new data figure.

This can be accomplished by only comparing data fields that are shared in common in each compared ordered flat file. Such a comparison can be requested via user application 102. In this manner, the present invention provides an extensible framework for managing hierarchical data.

Accordingly, FIGS. 1-3 and the corresponding text illustrate or describe a number of components, modules, and mechanisms for efficiently and quickly providing responses to database queries requesting hierarchically organized data.

Figure 4:
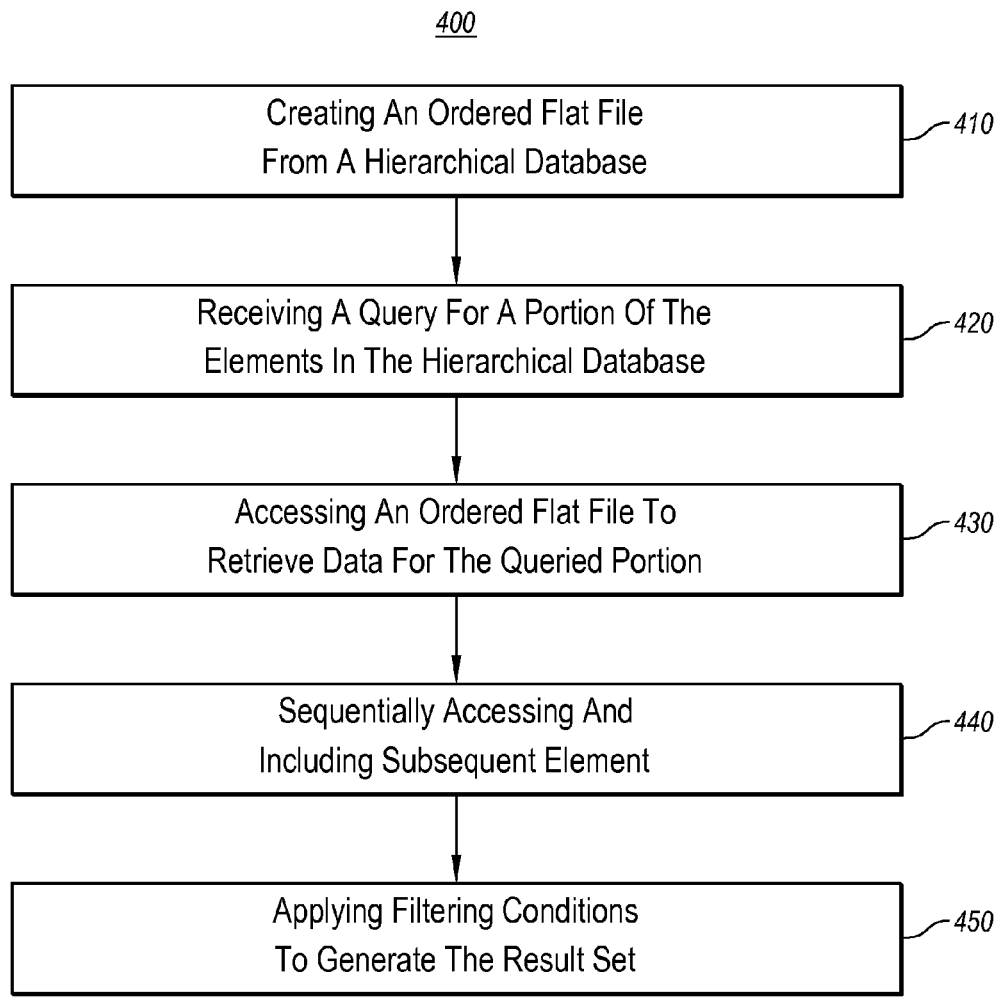
FIG. 4 is a flowchart of an exemplary method implemented by one or more embodiments of the invention.
Figure 5:
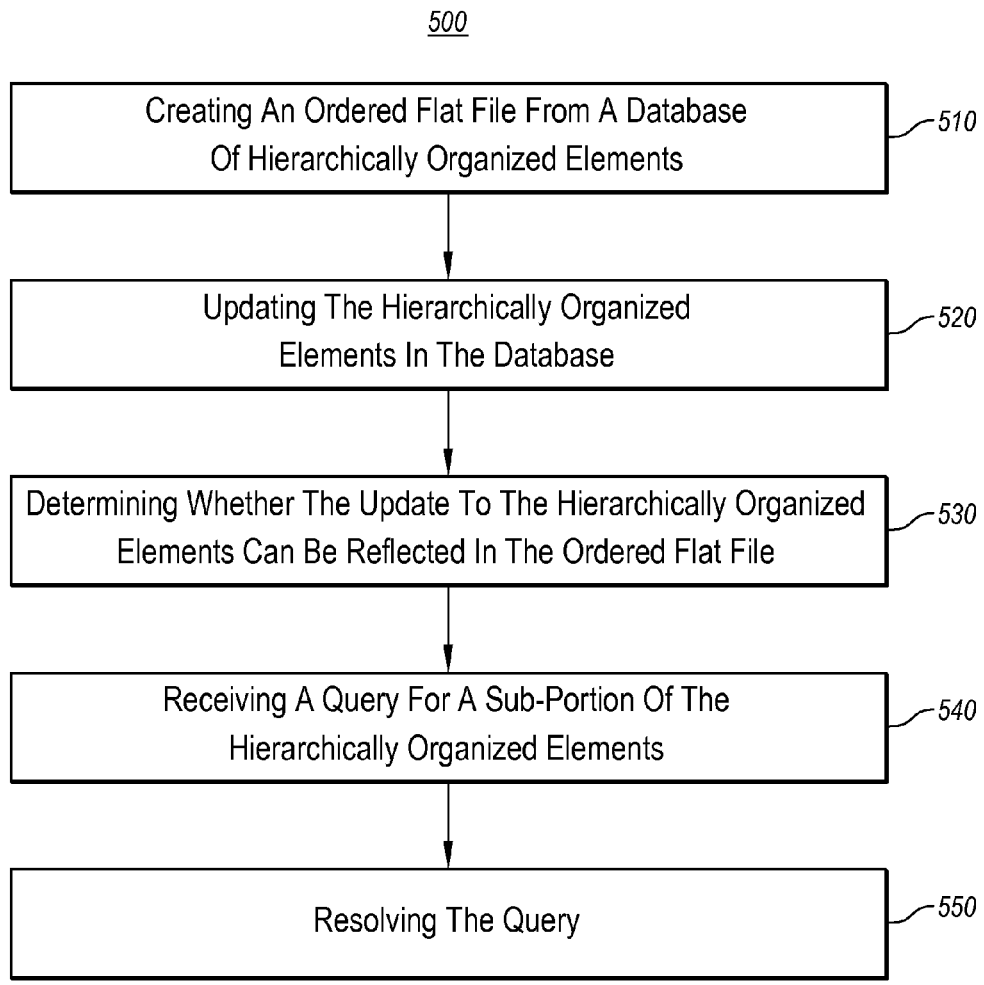
FIG. 5 is a flowchart of another exemplary method implemented by one or more embodiments of the invention.

In addition to the foregoing, implementations of the present invention can also be described in terms of methods comprising acts for accomplishing a particular result. For example, FIGS. 4 and 5 illustrate flowcharts of methods in accordance with implementations of the present invention for expediting the resolution of queries against hierarchically organized elements. The acts of FIGS. 4 and 5 are described below with reference to components and structures in FIGS. 1 through 3.

For example, FIG. 4 shows that a method (400) in accordance with the present invention of for expediting the resolution of the queries against hierarchically organized elements can comprise an act 410 of creating an ordered flat file from a database. Act 410 includes creating an ordered flat file from a database of hierarchically organized elements, wherein the ordered flat file maintains the hierarchical organization of the elements. For example, FIG. 2 shows that ordered flat file 106 can be created from hierarchically organized data 210 in database 107.

FIG. 4 also shows that the method (400) can comprise an act 420 of receiving a query for a portion of the elements in the hierarchical database. Act 420 includes receiving a query that includes filtering conditions to apply to a hierarchical sub-portion of the hierarchically organized elements to generate a result set. For example, FIG. 1 shows that server 104 receives query 103 from user application 102.

In addition, FIG. 4 shows that the method (400) can comprise an act 430 of accessing an ordered flat file to retrieve data for the queried portion. Act 430 includes accessing the ordered flat file to identify a parent element of the hierarchical sub-portion. For example, FIG. 1 shows that query processor 105 accesses ordered flat file 106. As shown in FIGS. 2 and 3, for example, if the hierarchical sub-portion is B's downline, ordered flat file 106 can be accessed to identify element B.

Furthermore, FIG. 4 shows that the method (400) can comprise an act 440 of sequentially accessing and including each subsequent element. Act 440 includes sequentially accessing each subsequent element and including each subsequent element in the sub-portion until an element is accessed that is at the same or higher level in the hierarchy as the parent element. For, as shown in FIGS. 2 and 3, each element up to element C (D through I) can be sequentially accessed and included in B's downline.

Still further, FIG. 4 shows that the method (400) can comprise an act 450 of applying filtering conditions to generate the result set. Act 450 includes an act of, while accessing the hierarchical sub-portion, applying the filtering conditions to each element in the sub-portion to generate the result set. For example, data from one or more of elements B through I can be used to generate a result set.

FIG. 5 shows that an additional or alternative method (500) of creating and maintaining an ordered flat file can comprise an act 510 of creating an ordered flat file from a database of hierarchically organized elements. Act 510 includes creating an ordered flat file from a database of hierarchically organized elements, wherein the ordered flat file maintains the hierarchical organization of the elements. For example, ordered flat file 106 can be created from hierarchically organized data 210 stored in database 107.

FIG. 5 also shows that the method (500) can comprise an act 520 of updating the hierarchically organized elements in the database. Act 520 includes updating, in the database, one or more elements of the hierarchically organized elements. For example, element J can be added to hierarchically organized data 210 as a child of element D.

In addition, FIG. 5 shows that the method (500) can comprise an act 530 of determining whether the update to the hierarchically organized elements can be reflected in the ordered flat file. Act 530 includes determining whether the updates to the one or more elements in the database can be reflected in the ordered flat file and: if the update can be reflected in the ordered flat file, updating the ordered flat file; and if the update cannot be reflected in the ordered flat file, adding an entry to an overflow area that represents the update, and modifying the ordered flat file to reflect the existence of the entry in the overflow area. For example, an entry for element J can be added to overflow area 311 and pointer 312a can be added to element D in ordered flat file 106.

Furthermore, FIG. 5 shows that the method (500) can comprise an act 540 of receiving a query for a sub-portion of the hierarchically organized elements. Act 540 includes receiving a query for a sub-portion of the hierarchically organized elements that includes at least one of the one or more updated elements. For example, a query for D's downline may be received.

Still further, FIG. 5 shows that the method (500) can comprise an act 550 of resolving the query. Act 550 includes resolving the query by accessing the ordered flat file and the overflow area to generate a hierarchically ordered result set that is accurate in real-time. For example, ordered flat file 106 can be accessed to retrieve element D and overflow area 311 can be accessed to retrieve element J from which a result set can be generated.

In some embodiments of the method (500), resolving the query by accessing the ordered flat file and the overflow area to generate a hierarchically ordered result set that is accurate in real-time may comprise acts of (1) accessing the ordered flat file to identify a parent element and including the parent element in the hierarchical sub-portion; and (2) sequentially accessing each subsequent element and including each subsequent element in the sub-portion until an element is accessed that is at the same or higher level in the hierarchy as the parent element. Sequentially accessing each subsequent element includes identifying that the ordered flat file indicates that an entry exists in the overflow area for an element that is in the hierarchical sub-portion, and including each subsequent element in the sub-portion includes accessing the overflow area to include the element in the overflow area in the hierarchical sub-portion In the methods of FIGS. 4 and 5, the ordered flat file may be accessed by using memory mapping techniques, such as using the mmap( ) function which allows data to be accessed using memory pointers rather than using read operations. The parent element of the sub-portion may be identified by either accessing each element in the ordered flat file until the parent element is identified, or by using an index to look up an offset of the parent element.

Accordingly, FIGS. 1-5, and the corresponding text, illustrate or describe a number of different components, structures, and mechanisms that expedite the processing of queries against hierarchically organized data. By creating and accessing an ordered flat file to resolve queries against the hierarchically organized data, the present invention enables the provision of user interfaces for requesting and viewing various types of data calculations on the hierarchically organized data in real time. These features are particularly beneficial to multi-level marketing schemes which employ downlines.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, DVD, or other optical disk storage, magnetic disk storage or other magnetic storage devices, or any other medium which can be used to store desired program code means (software) in the form of computer-executable instructions or data structures and which can be accessed by a general purpose or special purpose computer.

A "network" is defined as one or more data links that enable the transport of electronic data between computers and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer RAM and/or to less volatile computer storage media (devices) at a computer. Thus, it should be understood that computer storage media (devices) can be included in computer components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computers, which are linked (either by hardwired data links, wireless data links, or by a combination of hardwired and wireless data links) through a network, both perform tasks. In a distributed system environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

We claim:

1. At a server computer system that receives queries from one or more client computers for accessing hierarchically organized elements maintained in a database, a computerized method for expediting the resolution of the queries against the hierarchically organized elements, comprising:
    creating an ordered flat file from a database of hierarchically organized elements, wherein the ordered flat file maintains the hierarchical organization of the elements;
    receiving a query that includes filtering conditions to apply to a hierarchical sub-portion of the hierarchically organized elements to generate a result set;
    accessing the ordered flat file to identify a parent element of the hierarchical sub-portion;
    sequentially accessing each subsequent element in the sub-portion until an element is accessed that is at the same or higher level in the hierarchy as the parent element; and
    while accessing the hierarchical sub-portion, applying the filtering conditions to each element in the sub-portion to generate the result set.

2. The method of claim 1, further comprising accessing the ordered flat file via memory mapping.

3. The method of claim 2, further comprising identifying the parent element of the hierarchical sub-portion by one of:
    sequentially accessing each element in the ordered flat file beginning at the first element until the parent element is identified; or
    accessing an index that identifies an offset of each element in the ordered flat file to determine the offset of the parent element, and directly accessing the parent element by reading an address represented by the offset of the parent element without first reading any elements that precede the parent element in the ordered flat file.

4. The method of claim 1, further comprising:
    receiving one or more additional queries within the query, wherein the one or more additional queries includes second filtering conditions to apply to the hierarchical sub-portion to generate a second result set;
    while retrieving the hierarchical sub-portion, applying the second filtering conditions to each element in the sub-portion to generate the second result set such that multiple result sets are generated during a single sequential access of the ordered flat file.

5. The method of claim 4, wherein the second result set includes different elements of the hierarchical sub-portion than the result set.

6. The method of claim 1, wherein the result set includes some, but not all, of the elements in the hierarchical sub-portion.

7. The method of claim 1, wherein the hierarchical sub-portion is a downline of an organization that pays multi-level commissions.

8. The method of claim 7, wherein the filtering conditions comprise one of: individual sales criteria, entry-date criteria, location criteria, rank criteria, or commissions amount criteria such that the result set represents each individual in the downline that meets the criteria during a period of time.

9. The method of claim 1, wherein applying the filtering conditions further comprises:
creating one or more temporary fields for storing values generated while the hierarchical sub-portion is retrieved.

10. At a server computer system that receives queries from one or more client computers for accessing hierarchically organized elements maintained in a database, a computerized method for creating and updating an intermediate data structure that maintains the hierarchical organization of elements that is accessed to resolve queries against the hierarchically organized elements, comprising:
creating an ordered flat file from a database of hierarchically organized elements, wherein the ordered flat file maintains the hierarchical organization of the elements;
updating, in the database, one or more elements of the hierarchically organized elements;
determining whether the updates to the one or more elements in the database can be reflected in the ordered flat file and:
if the update can be reflected in the ordered flat file, updating the ordered flat file; and
if the update cannot be reflected in the ordered flat file, adding an entry to an overflow area that represents the update, and modifying the ordered flat file to reflect the existence of the entry in the overflow area;
receiving a query for a sub-portion of the hierarchically organized elements that includes at least one of the one or more updated elements; and
resolving the query by accessing the ordered flat file and the overflow area to generate a hierarchically ordered result set that is accurate in real-time.

11. The method of claim 10, wherein resolving the query by accessing the ordered flat file and the overflow area to generate a result set comprises:
accessing the ordered flat file to identify a parent element and including the parent element in the hierarchical sub-portion; and
sequentially accessing each subsequent element and including each subsequent element in the sub-portion until an element is accessed that is at the same or higher level in the hierarchy as the parent element,
wherein:
sequentially accessing each subsequent element includes identifying that the ordered flat file indicates that an entry exists in the overflow area for an element that is in the hierarchical sub-portion; and
including each subsequent element in the sub-portion includes accessing the overflow area to include the element in the overflow area in the hierarchical sub-portion.

12. The method of claim 10, wherein:
an update can be reflected in the ordered flat file if the update is to an existing element in the hierarchical organization; and
an update cannot be reflected in the ordered flat file if the update is an addition of an element to the hierarchical organization.

13. The method of claim 10, wherein modifying the ordered flat file to reflect the existence of the entry in the overflow area comprises adding an indicator to a field of an element in the ordered flat file.

14. The method of claim 13, wherein the element in the ordered flat file to which the indicator is added is the element that directly precedes the element in the overflow area in the hierarchical organization.

15. The method of claim 14, wherein the indicator comprises a pointer to the entry for the element in the overflow area.

16. The method of claim 15, further comprising:
adding a pointer to the entry for the element in the overflow area that points back to an element in the ordered flat file that directly follows the element in the overflow area in the hierarchical organization.

17. The method of claim 10, further comprising:
performing a memory mapping on the ordered flat file such that the ordered flat file is directly accessed via direct memory access.

18. The method of claim 10, further comprising:
receiving a request to compare the ordered flat file to one or more other ordered flat files that contain fields that are not included in the ordered flat file; and
comparing the fields that are shared in common in the compared ordered flat files while ignoring the fields that are not shared in common.

19. The method of claim 10, wherein resolving the query by accessing the ordered flat file and the overflow area to generate a result set further comprises:
creating and updating one or more temporary fields during an initial forward traversal of the sub-portion; and
returning the one or more temporary fields as part of the result set during a subsequent reverse traversal of the sub-portion.

20. One or more computer storage media comprising computer executable instructions stored thereon that, when executed by one or more processors in a server computer system, cause the server computer system to perform a computerized method of expediting the resolution of queries against hierarchically organized elements, comprising:
creating an ordered flat file from a database of hierarchically organized elements, wherein the ordered flat file maintains the hierarchical organization of the elements;
receiving a query that includes filtering conditions to apply to a hierarchical sub-portion of the hierarchically organized elements to generate a result set;
accessing the ordered flat file to retrieve the hierarchical sub-portion, wherein the hierarchical sub-portion is retrieved by:
identifying a parent element and including the parent element in the hierarchical sub-portion; and
sequentially accessing each subsequent element and including each subsequent element in the sub-portion until an element is accessed that is at the same or higher level in the hierarchy as the parent element; and
while retrieving the hierarchical sub-portion, applying the filtering conditions to each element in the sub-portion to generate the result set.

* * * * *